July 1, 1958  V. P. ARNAO  2,841,407
PORTABLE FOLDING CART-TABLE
Filed Feb. 11, 1957  2 Sheets-Sheet 2
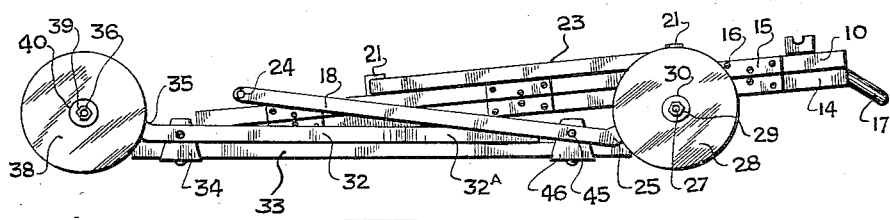
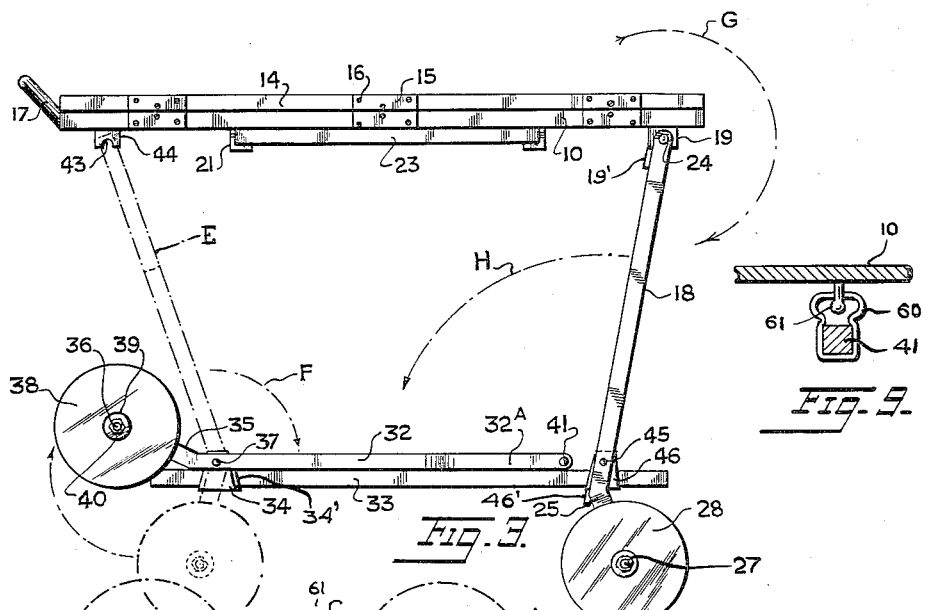
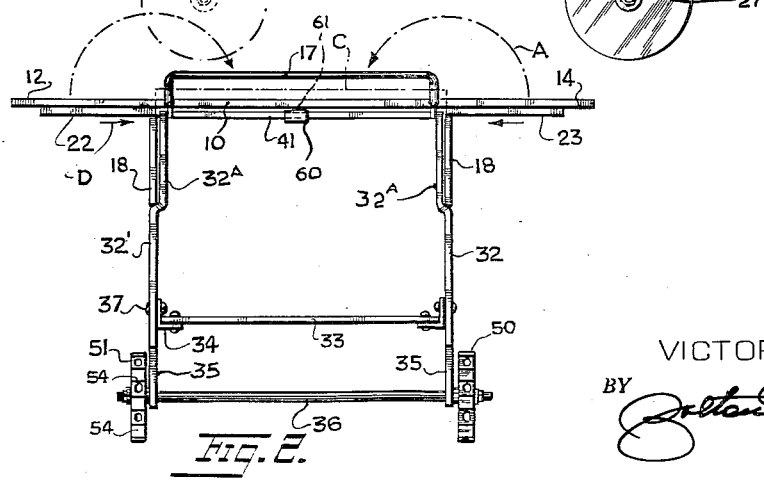
INVENTOR.
VICTOR P. ARNAO
ATTORNEY

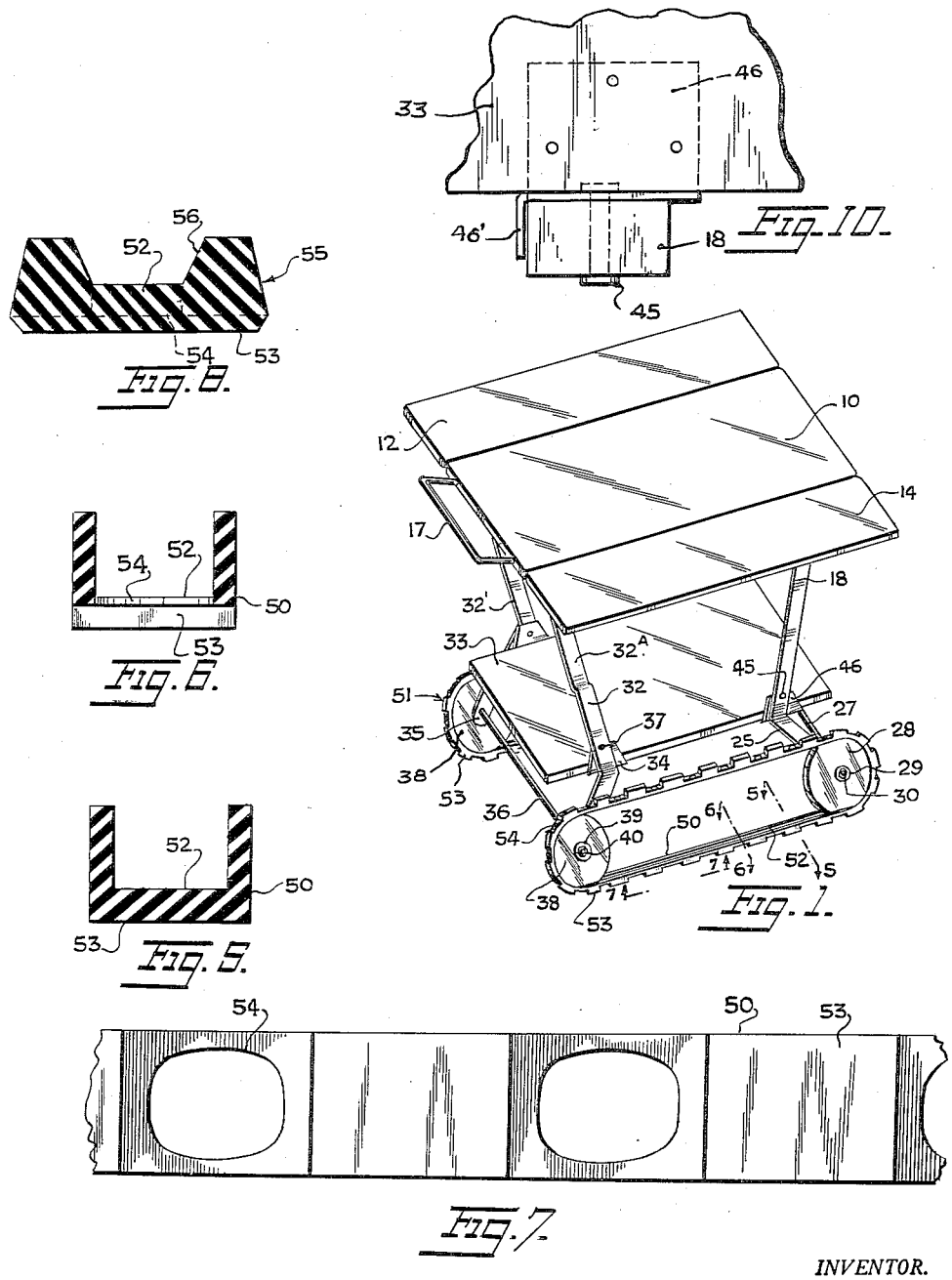

United States Patent Office 2,841,407
Patented July 1, 1958

2,841,407

PORTABLE FOLDING CART-TABLE

Victor P. Arnao, Brooklyn, N. Y.

Application February 11, 1957, Serial No. 639,544

6 Claims. (Cl. 280—36)

This invention relates to collapsible carts and particularly concerns a folding cart-table of general utility but especially useful as a food serving device adapted for outdoor use on sand, gravel, and unpaved grounds.

The cart-table is provided with a table top having attached hinged leaves. A utility storage shelf is located beneath the table top. Four legs depend from the table top and are so mounted thereon that the assembly of legs, shelf, table top and leaves fold or collapse to a very small size. A special feature of the invention is the provision of rotatable wheels at the extremities of the legs. A pair of endless tracks or belts are mounted on the wheels so that the cart can be pushed or pulled over rough ground outdoors, such as is usual at beaches, picnic grounds, and the like. The endless tracks facilitate movement of the cart over ground where the wheels alone would be useless, such as in mud, loose sand, fine gravel and cinders, unpaved roads and walks, etc. The tracks or belts can be removed and the cart-table may then be used indoors or out-of-doors as a wheeled vehicle. The tracks need not be removed for indoor use of the device. For folding the device for storage or convenient transportation the endless belts are removed.

It is therefore a principal object of the invention to provide a cart-table of the character described, including a pair of folding leaves attached to a table top, retractible legs, a storage shelf, a plurality of wheels, and a pair of endless belts mounted movably on the wheels.

A further object is to provide a cart-table of general utility useful indoors or out-of-doors and collapsible to facilitate transportation and/or storage of the cart-table.

A further object is to provide a cart-table useful for serving food, for storage of sundry items, and adaptable for use as a card table at a beach, picnic grounds, etc.

A further object is to provide a cart-table of the character described with endless belts to facilitate movement thereof over terrain where conventional wheel carts cannot be used.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a cart-table embodying the invention.

Fig. 2 is an end view of the cart-table.

Fig. 3 is a side elevational view of the cart-table partly collapsed, the drive belt being omitted.

Fig. 4 is a further side view showing the cart-table fully collapsed.

Figs 5 and 6 are sectional views taken on lines 5—5 and 6—6 respectively of the endless drive belt shown in Fig. 1.

Fig. 7 is a bottom plan view of a portion of the endless belt taken on line 7—7 of Fig. 1 on an enlarged scale.

Fig. 8 is a sectional view corresponding to Fig. 5 showing another form of drive belt.

Fig. 9 is a detail view showing the latching means for holding the table top.

Fig. 10 is a detail view showing the stop for limiting movement of the legs in one direction.

The device shown in Figs. 1–4 includes a table top 10. A pair of laterally disposed leaves 12, 14 are attached to the top 10 by hinges 15. The hinges are mounted by screws 16. A handle 17 is attached to the table top. A first pair of legs 18 are pivotally attached to brackets 19 secured to the underside of the table top at one end thereof. Another pair of L-shaped brackets 21 slidably support the brace members 22, 23. These brace members when extended laterally from the table top provide added support for the leaves 12, 14. These brace members may be used alternatively as laterally extendible work shelves if desired. Legs 18 are secured to brackets 19 by pins 24. The legs terminate in angularly disposed offset ends 25 which are joined by an axle 27, the ends of the axle extending laterally of table top 10. A pair of wheels 28 are rotatably mounted on the ends of the axle 27. A nut 29 and washer 30 serve to secure each wheel 28 on axle 27.

Another pair of legs 32, 32' is provided for the cart-table at the other end thereof. Each leg 32, 32' is pivotally attached by a pin 37 to a bracket 34 on shelf 33. Legs 32, 32' have angularly disposed ends 35 which are joined by axle 36. Wheels 38 are rotatably mounted on the ends of axle 36. Nuts 39 and washers 40 secure the wheels 38 to axle 36. The upper ends 32ª of legs 32, 32' are joined by a crossbar 41. This crossbar fits into recesses 43 in the brackets or lugs 44 secured to the table top 10. The ends 32ª of legs 32, 32' are offset from the planes of legs 32, 32' in order that legs 18 may be retracted completely, as best shown in Fig. 4.

Leg 18 are pivotally attached to shelf 33 by pins 45 anchored in brackets 46. Endless belts 50, 51 are mounted on each pair of laterally disposed wheels 28, 38. Each belt is made of a flexible material such as rubber, rubberized fabric, nylon, Fiberglas, or the like. Each belt has a central inner groove, track or channel 52 with straight side walls, as best shown in Figs. 5 and 6. The wheels 28, 38 fit into these channels or grooves and as the cart is pushed or pulled the wheels rotate as the belts move by friction with the supporting surface endlessly over them. Each belt has a plurality of teeth 53 on its outer side. Between the teeth at the bottom of the channel 52 are the openings 54. These openings serve to permit any gravel, dirt or other foreign material which may have entered channel 52 to fall out of the channel as the belt moves. Alternatively the wheels 28, 38 will force the foreign material out of channels 52 through the openings 54. If desired, the belts may be fabricated without the teeth 53 but in general the use of toothed or cogged belts is preferred, since they provide better traction on slippery ground.

In Fig. 8, the belt 55 is provided with a channel 52 having inclined side walls 56. The wheels which fit into this channel will be correspondingly shaped. Openings 54 are provided between the teeth 53 in the same arrangement as shown in Fig. 7.

The manner in which the cart-table is folded or collapsed is best shown in Figs. 2, 3 and 4. In Fig. 2, dotted arrows A indicate how the leaves 12 and 14 fold over the table top 10 to assume the dotted line position C. Braces 22, 23 move inwardly as indicated by arrows D to be completely retracted within brackets 21. In Fig. 3, the legs 32, 32' are shown rotated from dotted line position E to the solid line position where the offset ends 32ª rest on shelf 33. The legs are pivoted or rotated angularly as indicated by arrow F on pins 37. Legs 32, 32' are thus disposed parallel to shelf 33. In order to pivot legs 32, 32' the table top is lifted slightly by means of handle 17 to disengage crossbar 41 from lugs 44. Before the legs 32, 32' can be rotated the flexible belts 50, 51 are removed from the wheels. After legs 32, 32' are disposed in the solid line position shown in Fig. 3, the entire top of the cart-table including top 10, leaves 12, 14, and braces 22, 23 are rotated as indicated by arrow G around pins 24. At the same time the legs 18 are pivoted as indicated by arrow H so that the lower ends 25 of legs 18 are disposed coplanar with the ends 35 of the legs 32, 32'. Wheels 28 and 38 are also in coplanar disposition. The top 10 is upside down when fully retracted, as shown in Fig. 4, with the top 10 and leaves 12, 14 extending beyond the wheels 28. In this folded position the cart occupies a space no wider than the diameter of the wheels. The cart-table may thus be compactly transported or stored as necessary.

Lugs 19' depending from brackets 19 serve as stops to prevent the table top 10 from falling down when the legs 32, 32' are folded down on shelf 33. These lugs 19' also serve to prevent the legs 18, 18 from folding to the right rather than to the left as viewed in Fig. 3, as happens when the cart is completely folded. Similar lugs 34' mounted on brackets 34 serve as stops to prevent the legs 32, 32' from folding to the left rather than to the right as viewed in Fig. 3, as happens when the cart is completely folded. Lugs 46' secured to brackets 46 serve as stops to prevent the legs 18, 18 from folding to the right rather than to the left as viewed in Fig. 3, as happens when the cart is completely folded. These lugs, in addition to serving as stops, also serve to make the cart sturdy and rigid.

The crossbar 41 may be provided with a spring clip 60 at its center adapted to coact with a depending headed stud 61 on the undersurface of the table top 10 to lock the table top against accidental folding.

If desired, the wheels 28, 38 may be made of wood, metal, or plastic materials. They may be provided with tires if desired so that the cart can be more easily and silently wheeled about on solid ground when the belts are removed. The tires will be shaped to fit groove 52 in belts 50, 51 and 55.

It is to be understood that this arrangement may be used not only in cart-tables but also in baby carriages or in any other portable device.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A cart-table, comprising in combination: a generally rectangular table top, a pair of leaves hinged to opposite sides of said top and foldable thereover, a pair of braces slidably disposed underneath said top and arranged to support said leaves in extended positions thereof, a first pair of legs pivotally attached at one end to said top, said legs having straight portions, the other ends of said legs being angularly disposed to said straight portions, a first pair of wheels rotatably mounted on an axle supported by said other ends of said legs, a shelf supported between said wheels and said top, said shelf carrying a pair of brackets, said straight portions of said legs being pivotally attached to said brackets, another pair of legs having central portions pivotally attached to other brackets secured to said shelf, said other pair of legs having offset ends joined by a cross-bar, said table top carrying a pair of lugs with recesses adapted to retain ends of said crossbar therein, said other pair of legs each having one of its ends angularly disposed, another pair of wheels rotatably mounted on the other ends of said other pair of legs, a pair of endless belts, each of said belts being mounted to move endlessly over one wheel of the first pair of wheels and over one wheel of the second pair of wheels, each of said belts being a flexible member having an inwardly disposed endless groove arranged to fit the peripheries of said wheels, each of said belts having spaced teeth extending outwardly therefrom, said groove having a plurality of equally spaced openings in the bottom thereof, said openings being located between the teeth for passage of foreign material from the groove in the belt, whereby the cart-table may be moved over soft and slippery ground, and whereby the cart-table may be collapsed to a space having a width not greater than the diameter of said wheels.

2. A cart-table, comprising in combination: a generally rectangular table top, a pair of leaves hinged to opposite sides of said top and foldable thereover, a first pair of legs pivotally attached at one end to said top, said legs having straight portions, the other ends of said legs being angularly disposed to said straight portions, a first pair of wheels rotatably mounted on an axle supported by said other ends of said legs, a shelf supported between said wheels and said top, said shelf carrying a pair of brackets, said straight portions of said legs being pivotally attached to said brackets, another pair of legs having central portions pivotally attached to other brackets secured to said shelf, said other pair of legs having offset ends joined by a crossbar, said table top carrying a pair of lugs with recesses adapted to retain ends of said crossbar therein, said other pair of legs each having one of its ends angularly disposed, another pair of wheels rotatably mounted on the other ends of said other pair of legs, a pair of endless belts, each of said belts being mounted to move endlessly over one wheel of the first pair of wheels and over one wheel of the second pair of wheels, each of said belts being a flexible member having an inwardly disposed endless groove arranged to fit the peripheries of said wheels, each of said belts having spaced teeth extending outwardly therefrom, said groove having a plurality of equally spaced openings in the bottom thereof, said openings being located between the teeth for passage of foreign material from the groove in the belt, whereby the cart-table may be moved over soft and slippery ground, and whereby the cart-table may be collapsed to a space having a width not greater than the diameter of said wheels.

3. A cart-table, comprising in combination a generally rectangular table top, a first pair of legs pivotally attached at one end to said top, said legs having straight portions, the other ends of said legs being angularly disposed to said straight portions, a first pair of wheels rotatably mounted on an axle supported by said other ends of said legs, a shelf supported between said wheels and said top, said shelf carrying a pair of brackets, said straight portions of said legs being pivotally attached to said brackets, another pair of legs having central portions pivotally attached to other brackets secured to said shelf, said other pair of legs having offset ends joined by a crossbar, said table top carrying a pair of lugs with recesses adapted to retain ends of said cross bar therein, said other pair of legs each having one of its ends angularly disposed, another pair of wheels rotatably mounted on the other ends of said other pair of legs, a pair of endless belts, each of said belts being mounted to move endlessly over one wheel of the first pair of wheels and over one wheel of the second pair of wheels, each of said belts being a flexible member having an inwardly disposed endless groove arranged to fit the peripheries of said wheels, each of said belts having spaced teeth extending outwardly therefrom, said groove having a plurality of equally spaced openings in the bottom thereof, said openings being located between the teeth for passage of foreign material from the groove in the belt, whereby the cart-table may be moved over soft and slippery ground, and whereby the cart-table may be collapsed to a space having a width not greater than the diameter of said wheels.

4. A cart-table, comprising in combination: a generally rectangular table top, a pair of leaves hinged to opposite sides of said top and foldable thereover, a pair of braces slidably disposed underneath said top and arranged to support said leaves in extended positions thereof, a first pair of legs pivotally attached at one end to said top, said legs having straight portions, the other ends of said legs being angularly disposed to said straight portions, a first pair of wheels rotatably mounted on an axle supported by said other ends of said legs a shelf supported between said wheels and said top, said shelf carrying a pair of brackets, said straight portions of said legs being pivotally attached to said brackets, another pair of legs having central portions pivotally attached to other brackets secured to said shelf, said other pair of legs having offset ends joined by a crossbar, said table top carrying a pair of lugs with recesses adapted to retain ends of said crossbar therein, said other pair of legs each having one of its ends angularly disposed, another pair of wheels rotatably mounted on the other ends of said other pair of legs, a pair of endless belts, each of said belts being mounted to move endlessly over one wheel of the first pair of wheels and one wheel of the second pair of wheels, each of said belts being a flexible member having an inwardly disposed endless groove arranged to fit the peripheries of said wheels, said groove having a plurality of equally spaced openings in the bottom thereof, said openings providing passages for foreign material from the groove in the belt, whereby the cart-table may be moved over soft and slippery ground, and whereby the cart-table may be collapsed to a space having a width not greater than the diameter of said wheels.

5. A cart-table according to claim 4, wherein the groove in each of said belts has inclined sides arranged to fit correspondingly shaped sides of said wheels.

6. A cart-table according to claim 4, wherein the table top and shelf brackets have stop members to limit movement of the legs in one direction upon folding movement thereof.

References Cited in the file of this patent

UNITED STATES PATENTS

| | | |
|---|---|---|
| 207,626 | Sargent | Sept. 3, 1878 |
| 1,262,361 | Lafferty | Apr. 9, 1918 |
| 1,318,592 | Rainville | Oct. 14, 1919 |
| 1,931,522 | Barnes | Oct. 24, 1933 |
| 2,339,273 | Knox | Jan. 18, 1944 |
| 2,486,628 | Baker | Nov. 1, 1949 |
| 2,563,108 | Forbes | Aug. 7, 1951 |